United States Patent [19]
Stumpmeier

[11] 3,862,738
[45] Jan. 28, 1975

[54] TWO-WAY VALVE OF THE SEATED TYPE
[75] Inventor: Fritz Stumpmeier, Neu-Ulm, Germany
[73] Assignee: Hydromatik GmbH, Ulm/Donau, Germany
[22] Filed: Apr. 3, 1973
[21] Appl. No.: 347,432

[30] Foreign Application Priority Data
Apr. 17, 1972 Germany............................ 2218540
May 19, 1973 Germany............................ 2224576

[52] U.S. Cl. .................................... 251/43, 251/44
[51] Int. Cl. ......................................... F16k 31/383
[58] Field of Search .................... 251/43, 44, 26, 33

[56] References Cited
UNITED STATES PATENTS
| | | | |
|---|---|---|---|
| 793,429 | 6/1905 | Engberg............................ | 251/33 X |
| 2,480,712 | 8/1949 | Carbon............................. | 251/44 X |
| 3,075,737 | 1/1963 | Cantalupo et al. .................... | 251/26 |
| 3,533,434 | 10/1970 | Smith................................ | 251/26 X |
| 3,664,581 | 5/1972 | Stannow ............................ | 251/44 X |

FOREIGN PATENTS OR APPLICATIONS
834,670   11/1956   Great Britain........................ 251/44

Primary Examiner—Arnold Rosenthal
Attorney, Agent, or Firm—Owen, Wickersham & Erickson

[57] ABSTRACT

A valve of the seated type allows or prevents flow in either direction between two main connections. Each connection may serve as an inlet or an outlet. The valve comprises a valve piston which is urged by spring pressure on to a valve seat and, on the side of the valve piston facing away from its seat, a pressure balancing chamber communicating with the higher pressure side of the valve as well as with an externally controlled pilot valve. The pressure balancing chamber communicates with the two main connections of the valve through a connecting channel incorporating a differential pressure valve which operates to connect the pressure balancing chamber with that main connection of the valve which contains the higher pressure.

6 Claims, 3 Drawing Figures

TWO-WAY VALVE OF THE SEATED TYPE

BACKGROUND OF THE INVENTION

This invention relates to a seated valve of the type comprising a valve piston urged by spring pressure on to a valve seat, and, on the side of the valve piston remote from the valve seat, a pressure balancing chamber communicating with the high pressure inlet side of the valve as well as with an externally operable pilot valve.

Check valves of the seated type are simple devices for connecting or separating two circuits such as a hydraulic supply circuit and a hydraulic load circuit. Contrary to ordinary piston valves they are quick-acting. They can be designed with the valve piston sliding in a bush which affords the valve seat and which fits into a valve body provided with a cover plate which holds the bush in position, closes the pressure chamber, and contains an opening to make the connection to the pilot valve. Such units can be used in various ways by simply inserting them into prefabricated valve bodies, such as valve blocks which need not satisfy stringent demands regarding precision.

Known valves of the kind specified are open to the objection that they close only in one direction to flow and that, in circuits in which it is desired to control flow in either direction, considerable extra equipment is necessary to make the valve serviceable. Even in such arrangements rapid operation cannot be achieved if the direction of flow changes quickly and the pressure relationships abruptly reverse, unless expensive additional hydraulic circuitry is provided.

It is an object of the present invention to provide a valve of the kind specified which is of simple design and capable of allowing or preventing flow in either direction between the two main connections, and of operating even when there are sudden reversals in the direction of flow or pressure.

SUMMARY OF THE INVENTION

Thus according to the present invention a valve of the seated type for allowing or preventing flow in either direction between two main connections each of which may serve as inlet or outlet, comprises a valve piston urged by spring pressure on to a valve seat and, on the side of the valve piston facing away from its seat, a pressure balancing chamber communicating with the higher pressure side of the valve as well as with an externally controlled pilot valve, and the pressure balancing chamber communicates with the two main connections of the valve through a connecting channel incorporating a differential pressure valve which operates to connect the pressure balancing chamber with that main connection of the valve which contains the higher pressure. Thus upon reversal of the direction of flow or pressure, the pressure balancing chamber is promptly connected with the corresponding higher pressure, so that the position taken up by the main valve is always retained. The structural change required to achieve this versatility is remarkably small.

In one form of the invention the connecting channel and the differential pressure valve are located inside the main valve piston.

The pilot valve may be a threeway valve which either connects the pressure balancing chamber to the connecting channel, or connects the pressure balancing chamber to exhaust and shuts off the connecting channel. This arrangement avoids continuous loss of hydraulic fluid to the exhaust through the pilot valve when the main valve remains open. The differential pressure valve may communicate with the pilot valve through a connecting element which does not impede the movements of the valve piston. This may comprise a tube fitting to slide telescopically in a bore in the cover or in the valve system, or it may comprise a length of electric hose.

In one arrangement the valve piston slides in a bush which affords the valve seat and which fits into a valve body, provided with a cover plate which holds the bush in position, closes the pressure balancing chamber, and contains two openings, one for making the connection from the pressure balancing chamber to the pilot valve, and the other for the connecting element for the connecting channel to the pilot valve.

In one convenient arrangement the differential pressure valve is a double non-return valve having seats facing the two main valve connections and, between the two seats, an opening into the passage communicating the pressure balancing chamber.

Other objects, advantages and features will become apparent from the following detailed description of one embodiment presented in conjunction with the accompanying drawings.

DETAILED DESCRIPTION OF THE PREFERRED EMBODIMENTS

Figure 1:
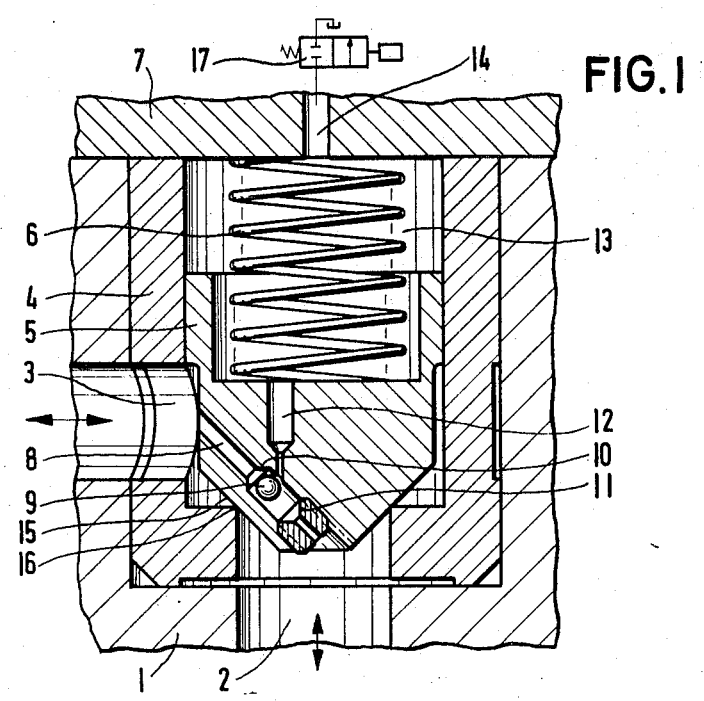
FIG. 1 is a longitudinal section of a valve containing a differential pressure valve in the valve piston.

FIG. 1 shows a valve comprising a body 1 containing openings 2 and 3 each of which may each serve alternately as inlet or exhaust, and which may be connected on the one hand to a pump and the other hand to a hydraulic load. A cylindrical bush 4 is fitted into the valve body 1 and held in position by a cover plate 7. Slidable inside the bush 4 is a valve piston 5 loaded by a spring 6 which is interposed between the piston and the cover plate 7 and urges the frusto-conical lower end 15 of the piston into the valve seat 16 afforded by the bush.

It will be noted that the seating encloses an area about half that of the piston, so that the pressure in each of the main openings 2 and 3 acts on a substantial area of the end of the piston, and a high pressure in either of these openings will serve to open the main valve against the action of the spring 6, irrespective of the pressure in the other opening.

The valve piston 5 is traversed by a connecting channel 8 which extends between the two openings 2 and 3. This channel contains a differential pressure valve in the form of a ball 9 which is forced into one of two seats 10 or 11 according to whichever side of the ball is exposed to the higher pressure. Moreover, the channel 8 is connected by a further channel 12 (which may contain a throttling constriction to a pressure balancing chamber 13 between the upper end of the piston and the cover plate 7. This chamber 13 is also connected through an opening 14 in the cover 7 to a simple pilot valve 17. When the pilot valve 17 is closed so that the hydraulic pressure in the chamber 17 cannot escape, the pressure that will build up in this chamber is the higher of the two pressures existing in the main valve openings 2 and 3, and the coned sealing face 15 of the valve piston will be forced into its seat 16 and block communication between the openings 2 and 3, irrespective of the direction of flow through the pump. However, the pilot valve can be opened to vent the pressure in the pressure balancing chamber 13 whereupon the pressure differential acting on the coned sealing face 15 from the openings 2 and 3 above and below the valve seat 16 generates a thrust which exceeds the thrust of the spring 6, and the valve piston 5 will life off its seat and provide communication between the two openings 2 and 3.

Figure 2:
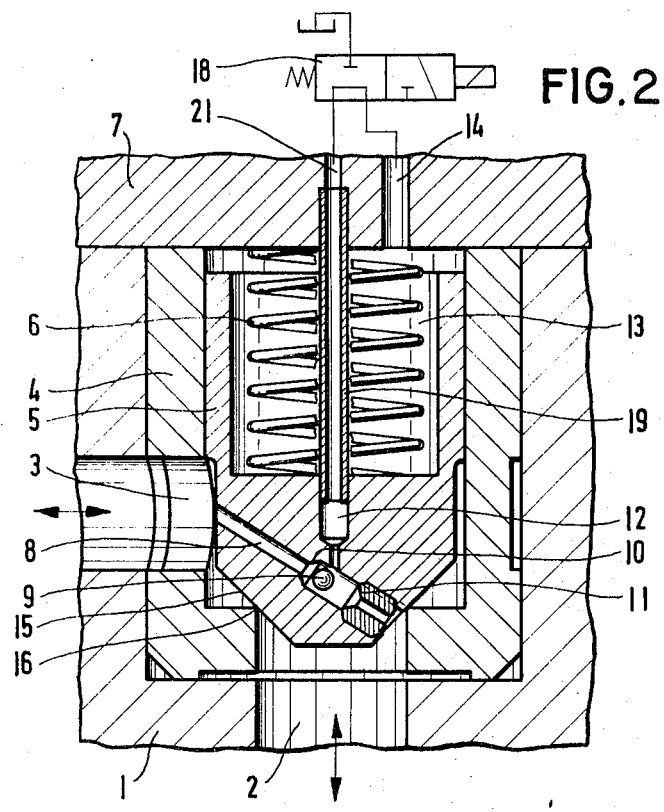
FIG. 2 is a longitudinal section like FIG. 1 of a second embodiment.

FIG. 2 shows an embodiment employing a three-way pilot valve and a differential pressure valve located in the valve piston, as shown in FIG. 1. The transverse duct 8 containing the differential pressure valve 9 communicates through a hole 12 (which may contain a throttling constriction and through a telescoping tube 19 with a hole 21 in the cover plate 7, this hole being connected to a three-way pilot valve 18. The tube 19 is firmly fitted into the hole 21 but telescopes in the bore 12 so that it does not hinder the movements of the valve piston 5. The pilot valve is also connected to the pressure balancing chamber 13 through a second hole 14 in the cover plate 7.

When the pilot valve 18 is in the position illustrated in FIG. 2 it prevents escape of hydraulic fluid from the pressure balancing chamber, so that the pressure inside this chamber will be equal to the higher of the pressures in the two openings 2 and 3 and the coned sealing face 15 of the valve piston 5 will therefore be held in sealing contact with its seat 16, blocking communication between the two openings 2 and 3 irrespective of the direction of flow through the pump. When the position of the pilot valve 18 is reversed it will connect the pressure balancing chamber 13 to exhaust through the hole 14 whilst at the same time blocking the exhaust from the connecting channel 8 through the hole 21. The difference between the pressures acting on the coned sealing face 15 from above and below the valve seat 16 will generate thrust exceeding the thrust of the spring 6 and thus lift the valve piston 5 to open a path between opening 2 and opening 3. Hydraulic fluid is not continuously lost through the pilot valve 18 when the main valve is open.

Figure 3:
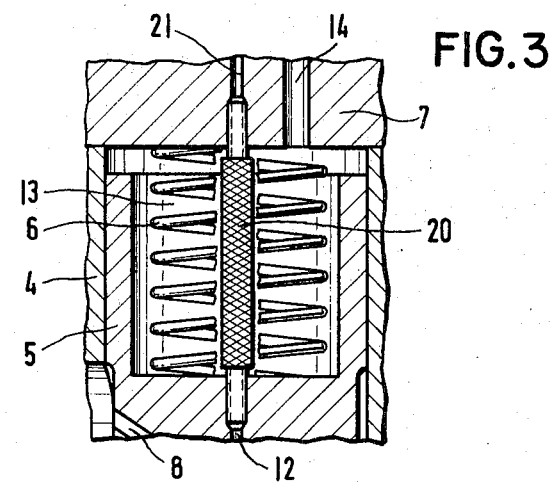
FIG. 3 is a view similar to part of FIG. 2 showing a further modification.

In the embodiment shown in FIG. 3 the connection constituted by the tube 19 is replaced by a length of elastic hose 20 which extends through the pressure balancing chamber 13 in the preceding embodiment, and which is firmly anchored in the two bores 12 and 21 by suitable fastening means. The elasticity of the hose 20 permits the valve piston 5 to move freely.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a shutoff valve for changing directions of flow between two connections which each may optionally serve as inlet or outlet and of the kind in which a valve piston with a conical sealing surface is urged by spring pressure onto a valve seat and a counterpressure chamber acts on the side of the valve piston facing away from the piston seat and communicates with the higher pressure side of the valve and is connected with an externally controlled pilot valve through which the pressure medium may be drawn off to cause the pressure medium on the higher pressure side of the valve to raise the valve piston from its seat, the improvement comprising, a single conduit disposed within the valve piston and open at one end to one of said connections and open at the other end to the other of said connections, said conduit having a single shuttle valve element and two spaced apart seats for the single shuttle valve element with each seat associated with one of said two connections to block flow through the conduit to one connection when the shuttle valve element is seated on a related seat, and a branch duct also disposed with the valve piston and connected at one end to said conduit between said two seats and connectable at an opposite end to the counterpressure chamber.

2. The invention defined in claim 1 wherein the pilot valve is a three-way valve and including tube means extending through the counterpressure chamber for containing flow from the branch duct to the pilot valve, and including a connection between the tube means and the valve piston which does not impair the mobility of the valve piston.

3. The invention defined in claim 2 wherein the tube means comprise a rigid tube and wherein one end of the tube is mounted for sliding movement in an end of the branch duct.

4. The invention defined in claim 2 wherein the tube means and connection include a length of flexible hose.

5. The invention defined in claim 1 wherein the pilot valve is a simple outlet valve which either closes the counterpressure chamber or connects it with the outlet and including a throttling constriction in the branch duct, 6. A valve of the seated type for allowing or preventing flow in either direction between two main connections each of which may serve as inlet or outlet, comprising a valve piston urged by spring pressure on to a valve seat and, on the side of the valve piston facing away from its seat, a pressure balancing chamber communicating with the higher pressure side of the valve as well as with an externally controlled pilot valve, characterised in that the pressure balancing chamber communicates with the two main connections of the valve through a connecting channel incorporating a differential pressure valve which operates to connect the pressure balancing chamber with that main connection of the valve which contains the higher pressure and wherein the connecting channel and the differential pressure valve are located inside the valve piston and wherein the connecting channel in the valve piston communicates with the pilot valve through a connecting element which does not impede the movements of the valve piston and wherein the connecting element is a tube fitting to slide telescopically in a bore in one of the cover and the valve piston.

* * * * *